(12) United States Patent
Ebrahimi Afrouzi et al.

(10) Patent No.: US 10,408,604 B1
(45) Date of Patent: Sep. 10, 2019

(54) REMOTE DISTANCE ESTIMATION SYSTEM AND METHOD

(71) Applicants: Ali Ebrahimi Afrouzi, San Jose, CA (US); Soroush Mehrnia, Copenhagen (DK)

(72) Inventors: Ali Ebrahimi Afrouzi, San Jose, CA (US); Soroush Mehrnia, Copenhagen (DK)

(73) Assignee: AI Incorporated, Toronto (CA)

( * ) Notice: Subject to any disclaimer, the term of this patent is extended or adjusted under 35 U.S.C. 154(b) by 412 days.

(21) Appl. No.: 15/257,798

(22) Filed: Sep. 6, 2016

Related U.S. Application Data (60) Provisional application No. 62/215,088, filed on Sep. 7, 2015.

(51) Int. Cl.
*G01B 11/14* (2006.01)
(52) U.S. Cl.
CPC .................................... *G01B 11/14* (2013.01)
(58) Field of Classification Search
CPC . G01S 17/00; G01S 17/46; G01S 7/48; G01S 7/481; G01S 7/486
See application file for complete search history.

(56) References Cited

U.S. PATENT DOCUMENTS

| | | | |
|---|---|---|---|
| 5,054,912 A | 10/1991 | Kuchel | |
| 6,545,749 B1 | 4/2003 | Andersson | |
| 6,847,435 B2 | 1/2005 | Honda et al. | |
| 7,187,452 B2 | 3/2007 | Jupp et al. | |
| 7,796,782 B1 | 9/2010 | Motamedi | |
| 7,889,324 B2 | 2/2011 | Yamamoto | |
| 7,995,799 B2 | 8/2011 | Schultz et al. | |
| 8,558,993 B2 | 10/2013 | Newbury et al. | |
| 2004/0001193 A1* | 1/2004 | Takaoka | G01C 3/085 356/3.03 |
| 2005/0280802 A1 | 12/2005 | Liu | |
| 2005/0285024 A1* | 12/2005 | Eubelen | G01S 7/481 250/221 |
| 2009/0147239 A1* | 6/2009 | Zhu | G01S 7/285 356/3.12 |
| 2016/0252619 A1* | 9/2016 | Markendorf | G01S 17/023 356/3.01 |

* cited by examiner

*Primary Examiner* — Luke D Ratcliffe (57) ABSTRACT

A method for estimating distances from a baseplate to arbitrary objects or surfaces around the baseplate. Two laser emitters emitting converging collimated laser beams, an image sensor, and an image processor are provided on the baseplate. Images of the laser projections on surfaces are captured by the image sensor. Captured images are sent to the image processor which extracts the pixel data of the laser projections within the images. The distance between the laser projections of the two laser emitters is analyzed and compared to figures in a preconfigured table that relates distances between laser projections with corresponding distances of the baseplate to projection surfaces in order to estimate a distance of the baseplate to the projection surface in the images.

7 Claims, 6 Drawing Sheets

REMOTE DISTANCE ESTIMATION SYSTEM AND METHOD

CROSS-REFERENCE TO RELATED APPLICATIONS

This application claims the benefit of the provisional patent application Ser. No. 62/215,088 filed Sep. 7, 2015 by the present inventors.

FIELD OF THE INVENTION

This disclosure relates to methods for remote distance estimation.

BACKGROUND OF THE DISCLOSURE

Mobile robotic devices are being used more and more frequently in a variety of industries for executing different tasks with minimal or no human interactions. Such devices rely on various sensors to navigate through their environment and avoid driving into obstacles.

Infrared sensors, sonar and laser range finders are some of the sensors used in mobile robotic devices. Infrared sensors typically have a low resolution and are very sensitive to sunlight. Infrared sensors that use a binary output can determine whether an object is within a certain range, but are unable to accurately determine the distance to the object. Sonar systems rely on ultrasonic waves instead of light. Under optimal conditions, sonar systems can be very accurate, however, sonar systems have limited coverage areas; if used in an array, they can produce cross-talk and false readings; if they are installed too close to the ground, signals can bounce off the ground, degrading accuracy; and sound-absorbing materials in the area can produce erroneous readings.

Laser Distance Sensors (LDS) are a very accurate method for measuring distance that can be used on robotic devices, but, due to their complexity and cost, these sensors are typically not a suitable option for robotic devices intended for day-to-day home use.

A need exists for a more accurate and reliable, yet affordable method for remotely estimating distances.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

The present invention introduces new method and system for distance estimation. Two laser light emitters are disposed on a baseplate, each emitting a collimated laser beam at a slight inward angle with respect to a center point of the baseplate, resulting in two light points projected onto surfaces opposite the emitter (except at the point where the collimated laser beams converge, where there will appear to be only one light point). At least one image sensor is disposed on the baseplate such that it captures the projections made by the laser light emitter within a predetermined range of distances. The image sensor iteratively captures images and sends them to an image processor provided on or in the baseplate. The image processor extracts the distance between the two light points (if any) and compares this distance to a preconfigured table that relates distances between light points with distances from the baseplate to the projection surface determine an estimated distance from the baseplate to the projection surface at the time of capture of each image.

In some embodiments, the laser light emitters emit collimated laser beams with different wavelengths so that the image sensor can distinguish the beams from each other and identify when the laser beam projections have switched places and begun diverging after the point of convergence.

In some embodiments, the assembly may be mounted on a rotatable base so that distances to surfaces may be analyzed in any direction.

DETAILED DESCRIPTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention. The disclosure described herein is directed generally to one or more processor-automated methods and/or systems that estimate distance of a device with an object also known as distance estimation systems.

This invention presents a distance estimation system comprised of at least: two converging laser light emitters disposed on a baseplate, a first image sensor disposed on the baseplate, and an image processor for extracting image data. Each laser light emitter emits a collimated laser beam. The laser light emitters shall be positioned such that the laser beams coincide at a predetermined distance from the baseplate. As a result, two areas, hereinafter referred to as light points or projected light points, will be illuminated on surfaces that are substantially opposite the emitter, up until the point where the laser beams coincide, at which point only one area will be illuminated. Beyond that point, the laser beams will diverge, and once again, two light points will be projected. The first image sensor shall be positioned such that the field of view thereof captures the projected light point or points within a predetermined range of distances. The image sensor is configured to iteratively capture images at predetermined intervals.

Images captured by the image sensor are sent to the image processor, which extracts data of the light point or points. Using computer vision technology, the image processor extracts the distance (if any) between the two points. If only one light point is detected, the distance extracted will be zero. This distance is compared to figures in a preconfigured table that relates distances between light points with distances between the baseplate and surfaces upon which the light points are projected (which may be referred to as 'projection surfaces' herein) to find an estimated distance between the baseplate and the projection surface at the time the image being analyzed was captured.

The preconfigured table is constructed from actual measurements of distances between the light points in images captured at predetermined increments in a predetermined range of distances between the baseplate and projection surfaces.

In some embodiments, a second image sensor is provided on the baseplate in a position mirroring the first image sensor. The process described above of iteratively capturing images of the one or two light points and analyzing the distance (if any) between them is repeated with images from the second image sensor. The image sensors are configured to capture images simultaneously so that the distance between the baseplate and projection surface is the same at the time of the capture of each image. The mean of the distances between light points from the images of each image sensor is found and this figure is compared to figures in the preconfigured table that relates distances between light points with distances between the baseplate and projection surfaces to find an estimated distance between the baseplate and the projection surface at the time of the capture of the images. A second image sensor, therefore, serves to improve the accuracy of the estimation.

In some embodiments, the two laser light emitters emit laser beams with different wavelengths so that the beams may be distinguished from each other. This doubles the effective range of the distance estimation system because the image sensors are able to distinguish the light points from each other and thus detect the when the laser beams are diverging (after coinciding). After the laser beams coincide, they will continue along their trajectory and diverge. The laser light beam that is emitted from the right side emitter will be on the left side after the point of convergence and the laser light beam that is emitted from the left side emitter will be on the right side after the point of convergence. By identifying that the light beams have switched places, the system can account for the change. (In contrast, in embodiments wherein the laser beams are indistinguishable, the system is only effective within the range of distances up to and at the point where the laser beams coincide, after which point the distance between the light points will increase from 0, but the system will have no way to distinguish these distances from the equivalent distances that will be measured between the light points before the point of convergence.)

In some embodiments, the laser light emitters are positioned at different heights on the baseplate. The laser beams will still converge, but the light points will move in a vertical plane in addition to horizontal plane of the image as the distance to the projection surface changes. This additional data will serve to make the system more accurate.

In some embodiments, the laser light emitters are positioned at a downward or upward angle with respect to a horizontal plane. The laser beams will still converge, but, in a similar manner as previously described, the light points will move in a vertical plane in addition to a horizontal plane of the image as the distance to the projection surface changes. This additional data will serve to make the system more accurate.

The present invention also proposes a distance tracking system in which a single laser light emitter is provided in the corner of a baseplate, positioned such that the emitted collimated laser beam is angled toward the opposite corner of the baseplate. An image sensor is positioned on the baseplate in the corner opposite of the laser light emitter such that the field of view thereof captures the projected light point within a predetermined range of distances. The image sensor is configured to iteratively capture images at predetermined intervals. Images captured by the image sensor are sent to an image processor, which extracts data of the light point. Images may be compared to each other in order to track the change in distance to the projection surface. For example, the coordinates of the light point in an image taken at time 1 may be compared to the coordinates of the light point in an image taken at time 2 to determine the change in distance to the projection surface from time 1 to time 2.

Figure 1A:
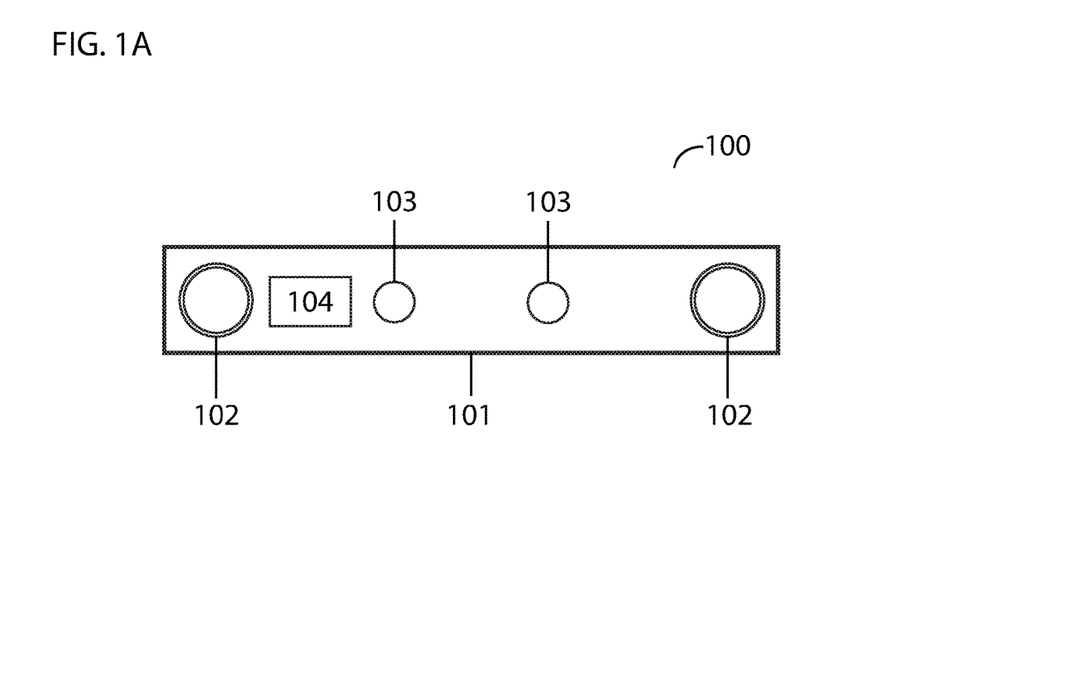
FIG. 1A illustrates a front elevation view of the distance estimation device embodying features of the present invention.
Figure 1B:
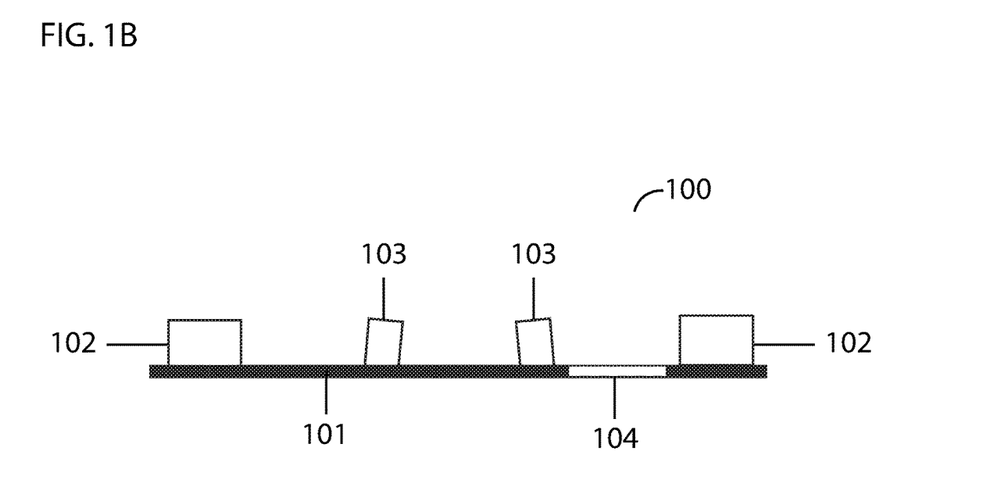
FIG. 1B illustrates an overhead view of the distance estimation device embodying features of the present invention.

Referring to FIG. 1A, a front elevation view of distance estimation device 100 is illustrated. Distance estimation device 100 is comprised of baseplate 101, image sensors 102, laser light emitters 103, and image processor 104. As mentioned previously, only one image sensor is necessary for the successful operation of the invention, however additional image sensors may improve accuracy. For illustrative purposes, two image sensors are shown in this example. The laser light emitters are positioned with a slight inward angle toward each other, with the point of convergence being a predetermined distance from the baseplate. The one or more image sensors shall be positioned such that the fields of view thereof will capture laser projections of the laser light emitters within a predetermined range of distances. Referring to FIG. 1B, an overhead view of distance estimation device 100 is illustrated. Distance estimation device 100 is comprised of baseplate 101, image sensors 102, laser light emitters 103, and image processor 104.

Figure 2:
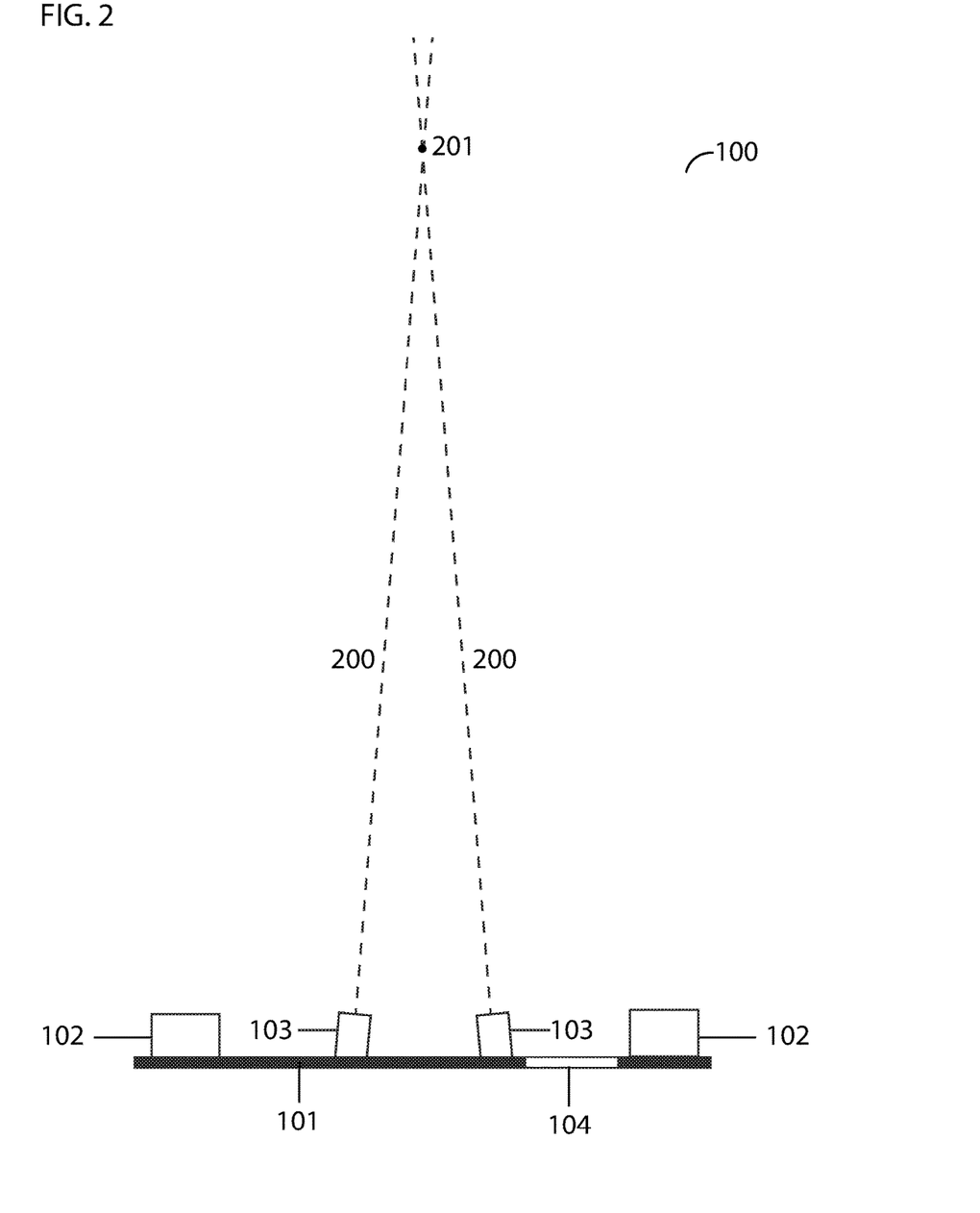
FIG. 2 illustrates an overhead view of the distance estimation device embodying features of the present invention.

Referring to FIG. 2, an overhead view of distance estimation device 100 is illustrated. Laser light emitters 103 are disposed on baseplate 101 and emit collimated laser light beams 200, which converge at point 201. Image sensors 102 are located on either side of the laser light emitters. Image processor 104 is located within baseplate 101. As discussed previously, in some embodiments, the maximum effective distance of the estimation device is at the point where the laser beams coincide. In other embodiments, using different wavelengths in each laser light emitter will allow the image processor to recognize the distances between the light points after the point of convergence as being further from the baseplate than the identical distances between the light points that will occur before the point of convergence. In distances beyond point 201, the laser beam from the right-most laser emitter will appear on the left side, and the laser beam from the left-most laser emitter will appear on the right side. Upon identifying the switch in locations of the laser beams, the image processor will determine that the extracted distance is occurring after the point of convergence.

Figure 3:
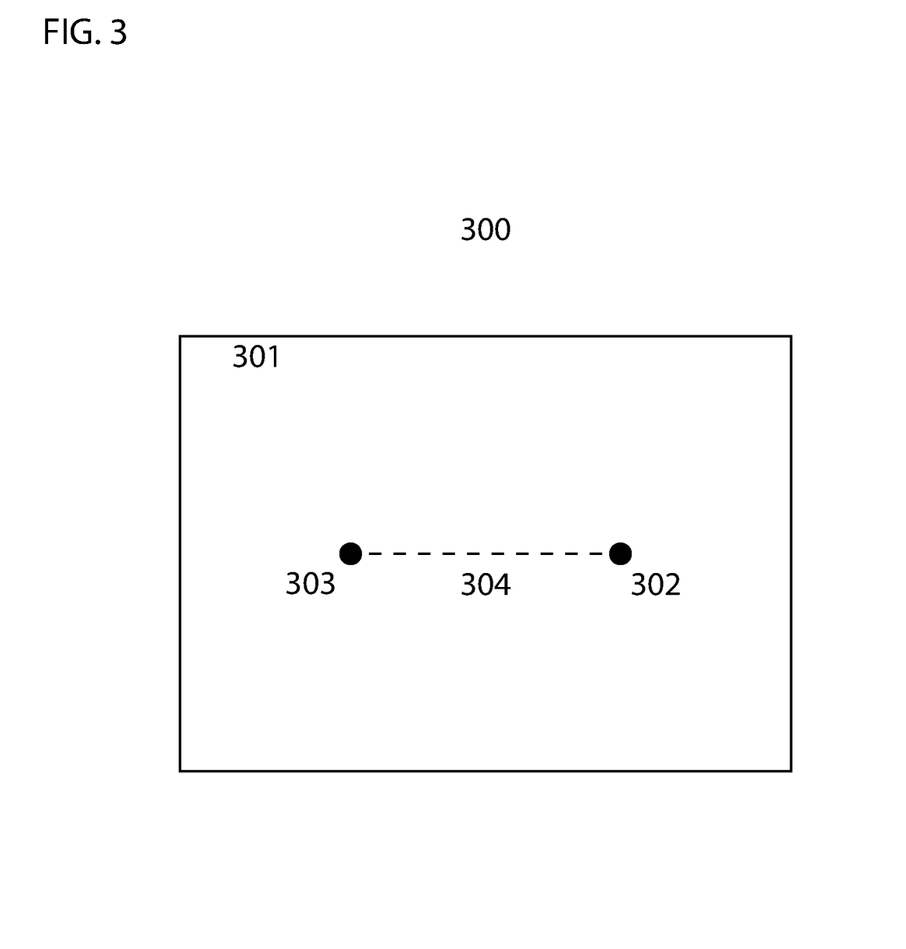
FIG. 3 illustrates an image captured by an image sensor embodying features of the present invention.

The one or more image sensors simultaneously and iteratively capture images at discrete time intervals. Referring to FIG. 3, an image 300 captured by an image sensor 102 (in FIG. 2) is illustrated. Rectangle 301 represents the field of view of image sensor 102. Points 302 and 303 represent the light points projected by the laser light emitters 103 (in FIG. 2). As the distance of the baseplate to projection surfaces increases, the light points 302, 303 will appear closer and closer together until the distance between them is null, after which point the light points will diverge from each other. Thus, the distance 304 between the two points may be analyzed to determine the distance to the projection surface at the time that an image is captured. The image 301 is sent to the image processor, which extracts the distance 304 between the two points (if any). The distance 304 is then compared to figures in a preconfigured table that co-relates distances between light points in the system with distances between the baseplate and projection surfaces to find an estimate of the actual distance from the baseplate to the projection surface at the time the image of the laser light projections was captured.

In some embodiments, the process of capturing an image, sending it to an image processor, and extracting the distance between the light points is performed simultaneously using a second image sensor, and the data extracted from images from the first image sensor is combined with the data extracted from the second image sensor to obtain a more accurate aggregate reading before consulting the preconfigured table.

Figure 4A:
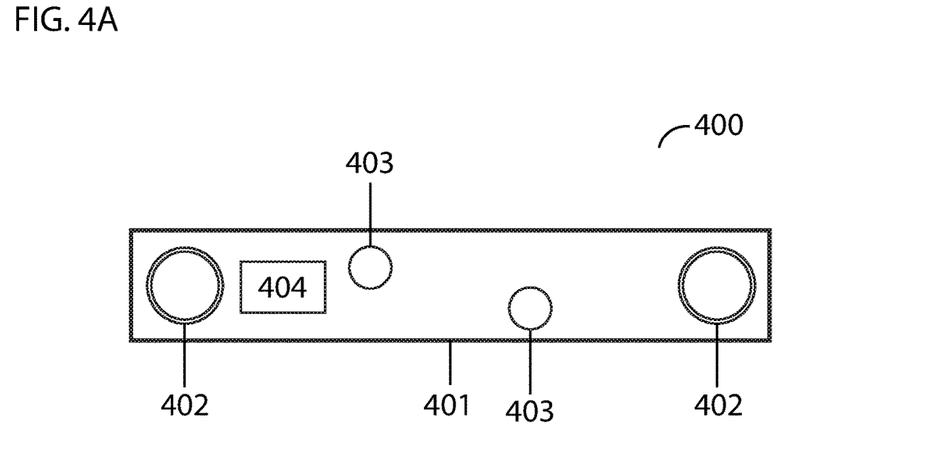
FIG. 4A illustrates a front elevation view of a distance estimation device with laser light emitters at different heights embodying features of the present invention.
Figure 4B:
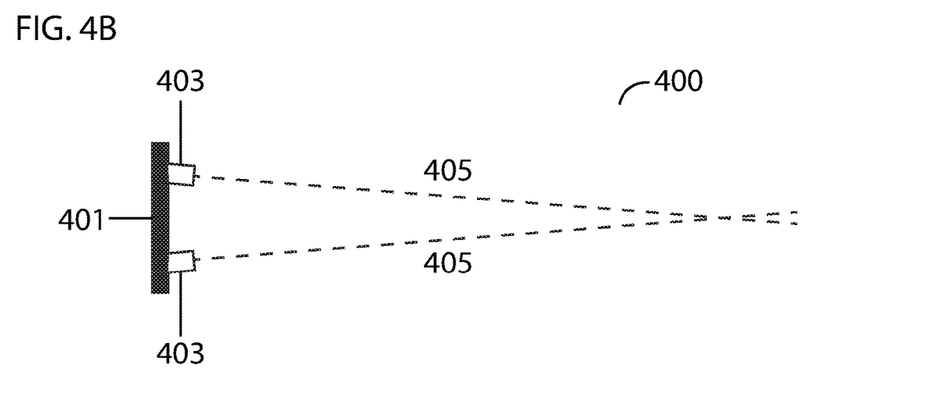
FIG. 4B illustrates a side elevation view of a distance estimation device with laser light emitters at different heights embodying features of the present invention.

Referring to FIG. 4A, an embodiment of the distance estimation device 400 with laser light emitters 403 positioned at different heights on the baseplate 401 is illustrated. Image sensors 402 and image processor 404 are laid out in the same fashion as described in previous embodiments. The laser beams will still converge, but the light points will move in a vertical plane in addition to a horizontal plane of captured images as the distance to the projection surface changes. This additional data will serve to make the system more accurate. FIG. 4B shows a side view of the distance estimation device 400 wherein the laser beam emissions 405 can be seen converging in a vertical plane. (The image sensors and image processor have been omitted from FIG. 4B in order to not unnecessarily obscure the laser light emitters.)

Figure 5A:
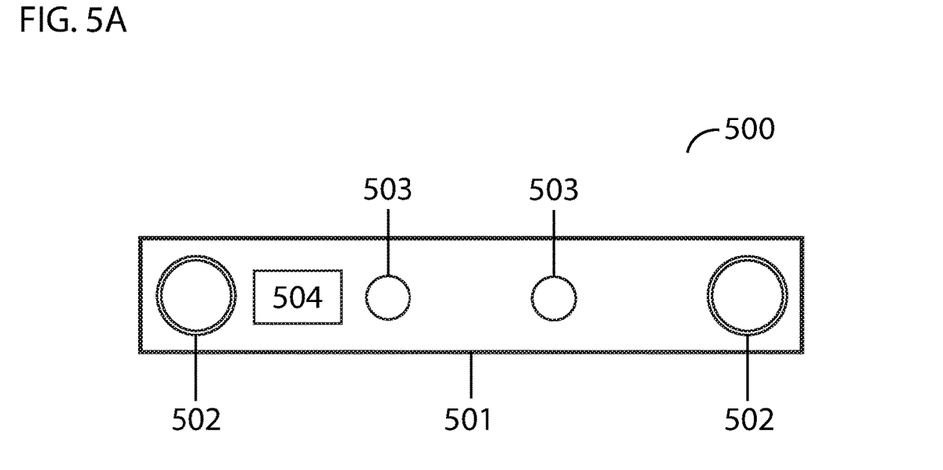
FIG. 5A illustrates a front elevation view of a distance estimation device with laser light emitters positioned at a downward angle embodying features of the present invention.
Figure 5B:
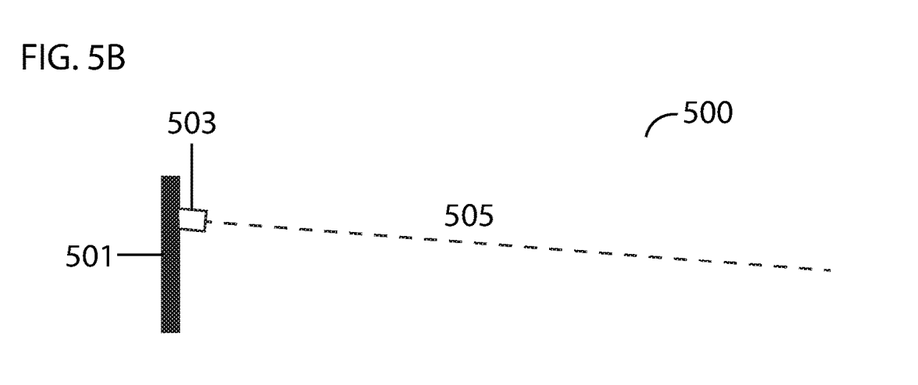
FIG. 5B illustrates a side elevation view of a distance estimation device with laser light emitters positioned at a downward angle embodying features of the present invention.

Referring to FIG. 5A, an embodiment of the distance estimation device 500 with laser light emitters 503 positioned on baseplate 501 at a downward angle with respect to a horizontal plane is illustrated. Image sensors 502 and image processor 504 are laid out in the same fashion as described in previous embodiments. The laser beams will still converge, but, in a similar manner as previously described, the light points will move in a vertical plane in addition to a horizontal plane of the image as the distance to the projection surface changes. This additional data will serve to make the system more accurate. FIG. 5B shows a side view of the distance estimation device 500 wherein the laser beam emissions 505 can be seen angled downward. (The image sensors and image processor have been omitted from FIG. 5B in order to not unnecessarily obscure the laser light emissions.)

Figure 6A:
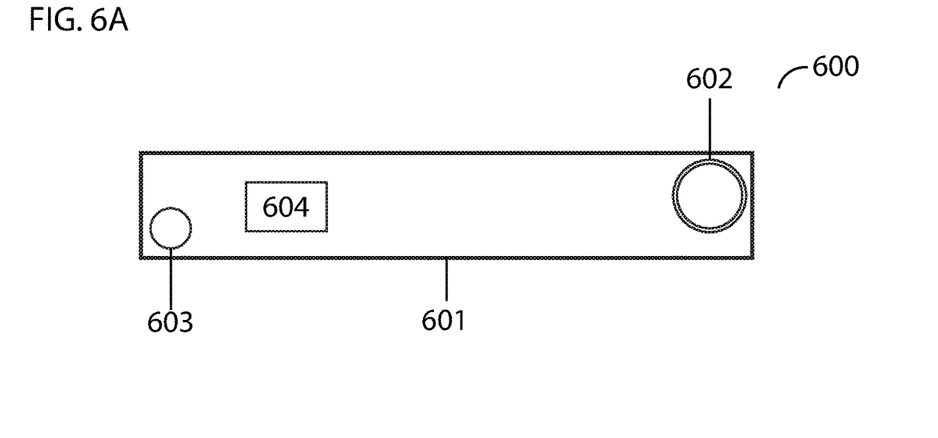
FIG. 6A illustrates a front elevation view of a distance tracking device embodying features of the present invention.
Figure 6B:
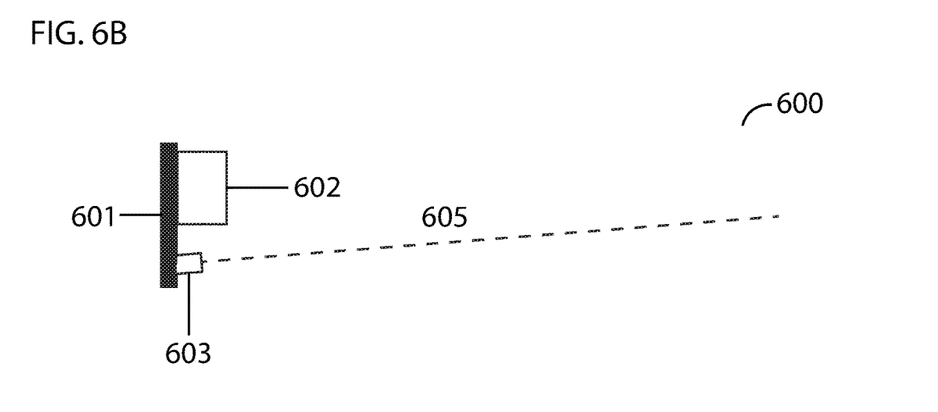
FIG. 6B illustrates a side elevation view of a distance tracking device embodying features of the present invention.
Figure 6C:
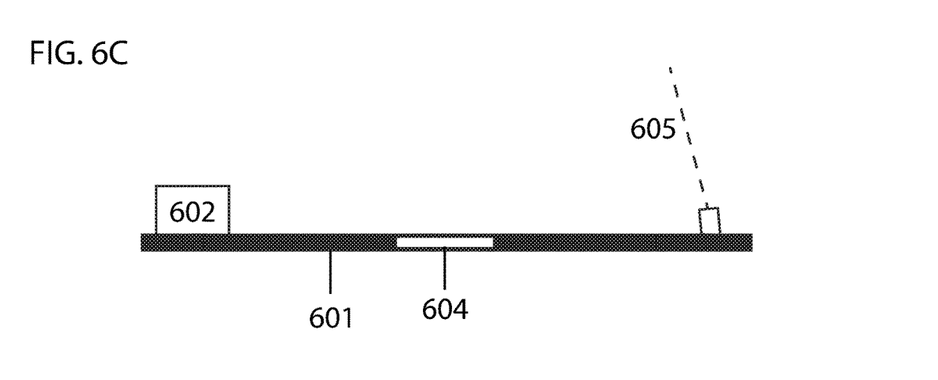
FIG. 6C illustrates an overhead view of a distance tracking device embodying features of the present invention.

Referring to FIGS. 6A, 6B and 6C, a distance tracking device 600 is illustrated. A laser light emitter 603 is positioned in first corner of baseplate 601 and an image sensor 602 is positioned in a second corner of the baseplate opposite the first corner. An image processor 604 is also disposed on the baseplate. Referring to FIG. 6A, a front elevation view of the distance tracking device 600 is illustrated. Referring to FIG. 6B, a side elevation view of the distance tracking device 600 is illustrated. From this angle, the y-axis movement of the laser beam emissions 605 can be seen. Referring to FIG. 6C, an overhead view of the distance tracking device 600 is illustrated. From this angle, the x-axis movement of the laser beam emissions 605 can be seen. The image sensor iteratively captures images at predetermined intervals and sends the images to the image processor, which extracts data of the light point. Images may be compared to each other in order to track the change in distance to the projection surface. For example, the coordinates of the light point in an image taken at time 1 may be compared to the coordinates of the light point in an image taken at time 2 to determine the change in distance to the projection surface from time 1 to time 2.

In some embodiments, the distance estimation device further includes a band-pass filter to limit the allowable light.

In some embodiments, the baseplate and components thereof are mounted on a rotatable base so that distances may be estimated in 360 degrees of a plane.

We claim:
1. A method for remotely estimating distances comprising:
in a first step, emitting at least two converging collimated laser beams from laser light emitters disposed on a baseplate, the laser outputs resulting in substantially two light points projected on surfaces substantially opposite the emitter, excepting at the point where the collimated laser beams converge, where substantially one light point is projected;
in a second step, capturing a first image of the projected light point or points with a first image sensor disposed on the baseplate such that the field of view thereof contains the projections of the laser light emitters within a predetermined range of distances;
in a third step, processing the first image with an image processor to extract a first distance between the light points in the first image; and, in a fourth step, comparing the first distance to figures in a preconfigured table that relates distances between light points with distances between the baseplate and surfaces on which the at least two converging collimated laser beams are projected to find an estimated distance between the baseplate and the surface on which the at least two converging collimated laser beams were projected at the time of the capture of the image.

2. The method of claim 1, further comprising:
substantially simultaneously to the second step, capturing a second image of the projected light point or points with a second image sensor disposed on the baseplate such that the field of view thereof contains the projections of the laser light emitters within a predetermined range of distances;
processing the second image with the image processor to extract a second distance between the light points in the second image;
calculating a median of the first distance and the second distance to get a median distance between the light points; and,
comparing the median distance to figures in the preconfigured table to find an estimated distance between the baseplate and the surface on which the at least two converging collimated laser beams were projected at or about the time of the capture of the first and second images.

3. The method of claim 1 wherein the figures in the preconfigured table are actual measurements of distances between the baseplate and surfaces on which the at least two converging collimated laser beams are projected and the corresponding distances between the light points in captured images at increments within a predetermined range of distances.

4. The method of claim 1 wherein the baseplate and components thereof are mounted on a rotatable base such that the baseplate may be rotated in any direction within a plane.

5. The method of claim 1 wherein the at least two converging collimated laser beams have different wavelengths which are used by the image processor to identify images wherein the light points have begun diverging after a point of convergence and thereby associate increases in the distance between light points with an increase in the distance from the baseplate to the surface upon which the at least two converging collimated laser beams are projected.

6. The method of claim 1 wherein the at least two converging collimated laser beams are positioned at different heights on the baseplate so that the light points in the first image will additionally be displaced in a vertical plane as distance from the baseplate to the surface upon which the at least two converging collimated laser beams are projected changes.

7. A method for remotely tracking changes in distance from a baseplate to surfaces comprising:
emitting a collimated laser beam from a laser light emitter disposed in a first corner of the baseplate at a predetermined angle toward a second corner of the baseplate opposite the first corner, the laser output resulting in substantially one light point projected on surfaces substantially opposite the baseplate;
iteratively capturing images of the projected light point by an image sensor positioned in a second corner of the baseplate opposite the first corner such that the field of view thereof contains the projected light point within a predetermined range of distances;
using an image processor to iteratively extract pixel information of the projected light point in each captured image;
iteratively comparing the pixel information from the images to determine a change in position of the projected light point within a field of view of the image sensor; and,
relating the change in position of the projected light point to a change in distance from the baseplate to the surface on which the collimated laser beam is projected.

* * * * *